(12) United States Patent
Todd et al.

(10) Patent No.: US 8,678,089 B2
(45) Date of Patent: Mar. 25, 2014

(54) CLEANUP FLUIDS FOR ANHYDROUS BORATE COMPOUNDS AND METHODS FOR USE THEREOF IN SUBTERRANEAN FORMATIONS

(75) Inventors: Bradley L. Todd, Duncan, OK (US); Thomas D. Welton, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 202 days.

(21) Appl. No.: 13/293,524

(22) Filed: Nov. 10, 2011

(65) Prior Publication Data

US 2013/0118747 A1    May 16, 2013

(51) Int. Cl.

| | |
|---|---|
| *E21B 37/06* | (2006.01) |
| *C04B 14/00* | (2006.01) |
| *C04B 22/00* | (2006.01) |
| *C09K 8/467* | (2006.01) |
| *C09K 8/506* | (2006.01) |

(52) U.S. Cl.
CPC ............. *C04B 22/0013* (2013.01); *C09K 8/467* (2013.01); *C09K 8/506* (2013.01)
USPC ......... 166/300; 166/278; 166/279; 166/305.1

(58) Field of Classification Search
CPC combination set(s) only.
See application file for complete search history.

(56) References Cited

U.S. PATENT DOCUMENTS

| | | |
|---|---|---|
| 5,146,985 A | 9/1992 | Alquie et al. |
| 6,896,058 B2 | 5/2005 | Munoz, Jr. et al. |
| 6,918,445 B2 | 7/2005 | Todd et al. |
| 2004/0261996 A1 | 12/2004 | Munoz et al. |
| 2006/0169182 A1 | 8/2006 | Todd et al. |
| 2008/0103068 A1 | 5/2008 | Parris |

FOREIGN PATENT DOCUMENTS

| | | |
|---|---|---|
| EP | 1413710 A1 | 4/2004 |
| WO | 2011154712 A1 | 12/2011 |
| WO | 2013070361 A1 | 5/2013 |

OTHER PUBLICATIONS

International Search Report and Written Opinion for PCT/US2012/059211 dated Dec. 6, 2012.
U.S. Appl. No. 12/957,522, filed Dec. 1, 2010.

*Primary Examiner* — Zakiya W Bates
(74) *Attorney, Agent, or Firm* — McDermott Will & Emery LLP; Craig W. Roddy

(57) ABSTRACT

Anhydrous borate compounds can be used in a variety of subterranean treatment operations, where particulates of the anhydrous borate compounds slowly become soluble in an aqueous fluid after facilitating the treatment operation. Cleanup fluids can be used for affecting a more rapid removal of the anhydrous borate compounds from a subterranean formation. Methods for performing a cleanup of anhydrous borate compounds within a subterranean formation can comprise providing a cleanup fluid comprising a polyhydroxylated compound, introducing the cleanup fluid into a subterranean formation having a plurality of anhydrous borate particulates therein, and interacting the polyhydroxylated compound with the anhydrous borate particulates such that the anhydrous borate particulates become soluble in an aqueous fluid.

18 Claims, No Drawings

CLEANUP FLUIDS FOR ANHYDROUS BORATE COMPOUNDS AND METHODS FOR USE THEREOF IN SUBTERRANEAN FORMATIONS

BACKGROUND

The present invention generally relates to the use of anhydrous borate materials in subterranean treatment operations, and, more specifically, to cleanup fluids for affecting the removal of anhydrous borate materials from a formation after a subterranean treatment operation.

Treatment fluids can be used in a variety of subterranean operations. Such subterranean operations can include, without limitation, drilling operations, stimulation operations, production operations, remediation operations, sand control treatments and the like. As used herein, the terms "treat," "treatment" and "treating" refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing treatments, scale dissolution and removal, consolidation treatments, and the like.

In the course of performing treatment operations in a subterranean formation, it can sometimes become necessary to block or divert the flow of certain fluids in the subterranean formation. In certain cases, it can sometimes be beneficial to divert the flow of a treatment fluid from a first region of the subterranean formation to a second region of the subterranean formation. For example, it can sometimes be desirable to divert a treatment fluid from a more permeable region of the subterranean formation to a less permeable region in which treatment is needed. In other cases, it can sometimes be desirable to temporarily seal fractures present within the subterranean formation to prevent fluid loss to the formation due to leak-off while a treatment operation is taking place. In still other cases, it can sometimes be desirable to seal the wellbore entirely for some period of time.

In most instances where a fluid is blocked or diverted in a subterranean formation during a treatment operation, it is desirable for the blockage or diversion to persist only temporarily, after which time production can resume. Temporary fluid blocking or diversion can also be desirable when a subterranean region that was formerly blocked needs to be subsequently treated with a treatment fluid to enhance its production. A number of substances have been used to temporarily block or divert fluid flow within a subterranean formation. Relative permeability modifiers can be used to block the flow of some fluids (e.g., an aqueous fluid) while not substantially inhibiting the flow of others (e.g., oil). Polymer gels can also be deposited within a subterranean formation to divert or block fluid flow therein. Once the gel has performed its desired function within the subterranean formation, the gel can be broken using various polymer breakers. Degradable polymers (e.g., polylactic acid) that degrade under the formation conditions and do not require the use of an external breaker can be used as well. A frequently encountered issue with polymer gels is that they can leave behind a gel residue on the surfaces of the subterranean formation, which oftentimes needs to be removed in a subsequent cleanup operation in order to restore the wellbore to full production.

Anhydrous borates are another class of materials that can be used for fluid blocking or diversion in subterranean formations. As used herein, the terms "anhydrous borates," "anhydrous borate compounds" and "anhydrous borate materials" will equivalently refer to borate materials lacking a water of hydration in its molecular structure. Anhydrous borates are relatively insoluble in water in their dehydrated state but slowly re-acquire water(s) of hydration over time. Once hydrated, the borate materials can become soluble in an aqueous fluid. Depending on the temperature and other conditions present in a subterranean formation, the time required for anhydrous borates to become soluble can range between about 8 hours and about 72 hours, or even longer. During the time period when the borate material is insoluble (e.g., in particulate form), treatment operations can be conducted in which the anhydrous borates divert or block fluid flow within the subterranean formation. Once treatment operations have been completed, it can sometimes be necessary to wait for the anhydrous borates to become at least partially soluble before resuming production.

Partially dehydrated borate materials can also be used for fluid blocking or diversion in a subterranean formation. As used herein, the term "partially dehydrated borate materials" will refer to hydrated borate materials that contain a single water of hydration, when other more hydrated forms of the borate material are known to exist. For example, sodium tetraborate (borax) can have several hydrated forms including, for example, a monohydrate, a pentahydrate and a decahydrate. In this example, the monohydrate would be considered a partially dehydrated borate material, since higher hydrated forms exist. Like anhydrous borates, partially dehydrated borate materials can become slowly soluble in an aqueous fluid. However, partially dehydrated borate materials generally can become soluble faster than do anhydrous borates, typically within the range of about 15 minutes to about 1 hour. Although this time period can be sufficient to conduct certain treatment operations, partially dehydrated borate materials do not typically offer the greater timing flexibility of anhydrous borates for conducting treatment operations.

SUMMARY

The present invention generally relates to the use of anhydrous borate materials in subterranean treatment operations, and, more specifically, to cleanup fluids for affecting the removal of anhydrous borate materials from a formation after a subterranean treatment operation.

In some embodiments, the present invention provides a method comprising: providing a cleanup fluid comprising a polyhydroxylated compound; introducing the cleanup fluid into a subterranean formation having a plurality of anhydrous borate particulates therein; and interacting the polyhydroxylated compound with the anhydrous borate particulates such that the anhydrous borate particulates become soluble in an aqueous fluid.

In some embodiments, the present invention provides a method comprising: introducing a plurality of anhydrous borate particulates into a subterranean formation; introducing a cleanup fluid comprising a polyhydroxylated compound into the subterranean formation; and solubilizing the anhydrous borate particulates in an aqueous fluid.

In some embodiments, the present invention provides a method comprising: providing a treatment fluid comprising a polyhydroxylated compound and a plurality of particulates that comprise an anhydrous borate compound; introducing the treatment fluid into a subterranean formation; and allowing sufficient time to pass for the anhydrous borate compound and the polyhydroxylated compound to interact with one another such that the anhydrous borate compound becomes soluble in an aqueous fluid.

The features and advantages of the present invention will be readily apparent to one having ordinary skill in the art upon a reading of the description of the preferred embodiments that follows.

DETAILED DESCRIPTION

The present invention generally relates to the use of anhydrous borate materials in subterranean treatment operations, and, more specifically, to cleanup fluids for affecting the removal of anhydrous borate materials from a formation after a subterranean treatment operation.

As described above, anhydrous borate materials and partially dehydrated borate materials can be particularly advantageous when used in a subterranean formation for fluid blocking or diversion applications. For example, particulates of these materials can form a physical barrier within a subterranean formation that at least partially blocks flow of at least one fluid therein. Anhydrous borate materials and partially dehydrated borate materials can allow a treatment operation to be performed in a subterranean formation without the requirement of a separate cleanup and/or remediation operation to degrade and remove the materials or a residue produced therefrom. In addition, anhydrous borate materials and partially dehydrated borate materials are essentially non-toxic, and their use in a subterranean formation does not raise significant environmental concerns. A further advantage of anhydrous borate materials is that they have relatively high melting points (e.g., 840° F. for anhydrous boric acid and 1367° F. for anhydrous sodium tetraborate), making them particularly well suited for high temperature subterranean formations, since they will not undergo softening therein. Yet a further advantage of anhydrous borate materials compared to other types of degradable particulates is that they are relatively unaffected by acids, thereby extending the downhole conditions under which they can be effectively utilized.

Although anhydrous borate materials and partially dehydrated borate materials can be effectively used in subterranean treatment operations and thereafter allowed to degrade (i.e., become soluble) at their native dissolution rate, it can, in some embodiments, be more desirable to degrade the materials faster than their native dissolution rate in returning a wellbore to production. Specifically, once it is no longer necessary to divert or block fluid flow within a subterranean formation, the delay in waiting for the anhydrous borate materials or partially dehydrated borate materials to again become soluble can result in expensive production delays. Such production delays can be particularly costly in offshore drilling applications, where the cost of maintaining an offshore drilling platform can easily exceed one million dollars per day. According to some of the present embodiments, a cleanup fluid can be used in conjunction with anhydrous borate materials or partially dehydrated borate materials to facilitate their dissolution, thereby allowing production to more rapidly resume.

It is also to be recognized that in any of the embodiments specifically described herein utilizing an anhydrous borate material, a partially dehydrated borate material can also be used within the spirit and scope of the present disclosure in a substantially equivalent manner. Although partially dehydrated borate materials generally can become soluble more rapidly than do anhydrous borate materials, it can still be advantageous to increase their dissolution rate in an aqueous fluid in some cases.

According to the present embodiments, a cleanup fluid comprising a polyhydroxylated compound can be used to increase the dissolution rate of an anhydrous borate material in a subterranean formation, thereby allowing production to resume sooner than would be possible without performing the cleanup. As a result of interacting with the polyhydroxylated compound, anhydrous borate particulates can become soluble in an aqueous fluid (e.g., the cleanup fluid or another aqueous fluid, including an aqueous formation fluid) more rapidly than do anhydrous borate particulates dissolving at their native dissolution rate. As used herein, the term "polyhydroxylated compound" refers to a compound having at least two hydroxyl (e.g., alcohol) substituents. A number of suitable polyhydroxylated compounds are set forth hereinbelow. Many of these polyhydroxylated compounds are naturally occurring sugars or sugar alcohols, which help maintain the low environmental impact of the anhydrous borate materials.

Without being bound by any theory or mechanism, it is believed that the treatment of an anhydrous borate material with a polyhydroxylated compound can result in functionalization of the borate material with boronate ester functionalities. Once functionalized, the anhydrous borate material can experience a change in solubility properties and become much more soluble in solvents. In embodiments where the polyhydroxylated compound itself possesses appreciable water solubility, the functionalized borate material can become soluble in an aqueous fluid much more rapidly than if the borate material is allowed to solubilize at its native dissolution rate. In particular, it is believed that polyhydroxylated compounds containing a vicinal diol, and optionally other hydroxyl substituents, can form a cyclic boronate ester derivative that is sufficiently stable to become soluble and be removed in an aqueous fluid. It is also believed that polyhydroxylated compounds not containing a vicinal diol can also form a soluble boronate ester, albeit at a slower dissolution rate than vicinal diols.

In addition to simply increasing the dissolution rate of anhydrous borate materials, the quantity of polyhydroxylated compound in the cleanup fluid can be further adjusted to produce a dissolution rate suitable for a particular application. That is, the degree to which the dissolution rate of the anhydrous borate material is increased can be adjusted in some embodiments. In some embodiments, less than a stoichiometric amount of the polyhydroxylated compound relative to the anhydrous borate material can be used. In such embodiments, it is believed that the anhydrous borate material can become incompletely functionalized, and the dissolution rate increase is not as great as than if full functionalization takes place. It is further believed that in such embodiments, the dissolution rate may still rely, at least somewhat, on the native dissolution rate of the anhydrous borate material. In some embodiments, a stoichiometric or greater amount of the polyhydroxylated compound relative to the anhydrous borate material can be used. When a stoichiometric or greater amount of the polyhydroxylated compound is used, it is believed that substantially all of the anhydrous borate material can become functionalized to increase the dissolution rate in an aqueous fluid. In such embodiments, it is believed that the dissolution rate may rely less upon the native dissolution rate of the anhydrous borate material. In addition, it is believed that excess polyhydroxylated compound can increase the solubility of the anhydrous borate material through increasing its compatibility with an aqueous fluid without functionalization taking place.

In addition to the amount of polyhydroxylated compound, the chemical structure of the polyhydroxylated compound can influence the dissolution rate of the anhydrous borate material. For example, it is believed that polyhydroxylated compounds containing a vicinal diol can react more rapidly with anhydrous borate materials than do polyhydroxylated compounds not containing a vicinal diol. In addition, some polyhydroxylated compounds having multiple stereogenic centers can react more rapidly with the anhydrous borate materials due to diastereoselectivity effects.

It is to be noted that the embodiments described herein are applicable when the anhydrous borate materials are present in particulate form (i.e., as a solid). In various embodiments, the anhydrous borate materials can have a particulate size ranging between about 1 micron and about 150 microns. In some embodiments described herein, the anhydrous borate materials can be present in a subterranean formation as a pack comprising a plurality of anhydrous borate particulates. In certain subterranean treatment operations, borate materials can be present in a subterranean formation in dissolved form or introduced into a subterranean formation in a non-slurry fluid form. Although polyhydroxylated compounds can still react with a soluble borate material to produce a boronate ester, the present methods are to be distinguished over subterranean treatment operations utilizing borate materials that are already soluble, since the formation of a boronate ester does not induce solubility in this case.

In some embodiments, methods described herein can comprise providing a cleanup fluid comprising a polyhydroxylated compound, introducing the cleanup fluid into a subterranean formation having a plurality of anhydrous borate particulates therein, and interacting the polyhydroxylated compound with the anhydrous borate particulates such that the anhydrous borate particulates become soluble in an aqueous fluid.

In some embodiments, methods described herein can comprise introducing a plurality of anhydrous borate particulates into a subterranean formation, introducing a cleanup fluid comprising a polyhydroxylated compound into the subterranean formation, and solubilizing the anhydrous borate particulates in an aqueous fluid.

In some embodiments, anhydrous borate particulates can be introduced into a subterranean formation by using a treatment fluid. When introducing anhydrous borate particulates into a subterranean formation by way of a treatment fluid, the treatment fluid can enter a subterranean zone. The treatment fluid can penetrate into the subterranean zone by naturally occurring or manmade openings, fissures, fractures and the like, and the anhydrous borate particulates can become deposited therein as they are screened out by the formation. After being deposited, the anhydrous borate particulates can block or divert the flow of fluids in the subterranean formation. Likewise, larger quantities of the anhydrous borate particulates can be used to plug the annulus of a wellbore penetrating a subterranean formation, thereby blocking the flow of fluids therefrom.

In some embodiments, cleanup fluids or treatment fluids described herein can comprise an aqueous carrier fluid. The aqueous carrier fluid can generally be from any source. In various embodiments, the aqueous carrier fluid can comprise fresh water, acidified water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, and the like.

In various embodiments, the anhydrous borate particulates can comprise an anhydrous borate compound. Suitable anhydrous borate compounds can include, for example, anhydrous sodium tetraborate, anhydrous boric acid (also known as boric oxide), and any combination thereof. Use of such anhydrous borate compounds in fluid blocking and diversion operations is described in commonly owned U.S. Pat. No. 6,896,058, which is incorporated herein by reference in its entirety.

As described above, partially dehydrated borate compounds can be substituted for anhydrous borate compounds in some of the present embodiments. Specifically, in some embodiments, sodium tetraborate monohydrate can be used in place of an anhydrous borate compound. Use of sodium tetraborate monohydrate in fluid blocking and diversion operations is described in commonly owned U.S. patent application Ser. No. 12/957,522, filed Dec. 1, 2010, which is incorporated herein by reference in its entirety.

A wide variety of polyhydroxylated compounds can be used in the present embodiments. In some embodiments, anhydrous borate particulates and a polyhydroxylated compound can react to form a boronate ester that is soluble in an aqueous fluid. In some embodiments, the polyhydroxylated compound can comprise a diol. In some embodiments, the diol can comprise a vicinal diol (i.e., a 1,2-diol). Vicinal diols are believed to react with the anhydrous borate particulates to produce a cyclic 5-membered boronate ester. In some embodiments, the diol can comprise a 1,3-diol. Such 1,3-diols are believed to react with the anhydrous borate particulates to produce a cyclic 6-membered boronate ester. It is also to be recognized that polyhydroxylated compounds not comprising a 1,2- or 1,3-diol can also be used in alternative embodiments. However, in the case of these polyhydroxylated compounds, it is believed that a non-cyclic boronate ester can form, which can take longer to form and be less stable than a cyclic boronate ester.

In more specific embodiments, polyhydroxylated compounds suitable for use in the present embodiments can comprise a sugar, a sugar alcohol, or any combination thereof. When used, sugars can be in their open chain or closed ring forms. When used in a closed ring form, sugars can comprise monosaccharides, disaccharides, trisaccharides, and higher oligomers. Suitable sugars can include, for example, sucrose, lactose, fructose, glucose, maltose, and the like. In addition, in some embodiments, dehydrosugars and dehydrosugar alcohols can be used in some embodiments. In some embodiments, the polyhydroxylated compound can comprise a sugar alcohol. Suitable sugar alcohols, in addition to other suitable polyhydroxylated compounds, are set forth hereinbelow. In some embodiments, a suitable sugar alcohol can be joined to a monosaccharide or higher saccharide oligomer through a glycosidic bond.

In some embodiments, polyhydroxylated compounds suitable for use in the present cleanup fluids can include, for example, mannitol, sorbitol, xylitol, glycerol, erythritol, arabitol, ribitol, dulcitol, iditol, isomalt, maltitol, lactitol, polyglycitol, polyvinylalcohol, ethylene glycol, diethylene glycol, triethylene glycol, tetraethylene glycol, propylene glycol, tartaric acid, ascorbic acid, erythorbic acid, any combination thereof, and any derivative thereof.

In some embodiments, the polyhydroxylated compound can be present in at least a stoichiometric amount relative to the anhydrous borate particulates. That is, a molar ratio of the polyhydroxylated compound to the anhydrous borate particulates can be about 1:1 or greater. In some embodiments, the molar ratio of the polyhydroxylated compound to the anhydrous borate particulates can be about 1.2:1 or greater, or about 1.5:1 or greater, or about 2:1 or greater, or about 2.5:1 or greater, or about 3:1 or greater, or about 3.5:1 or greater, or about 4:1 or greater, or about 4.5:1 or greater, or about 5:1 or greater, or about 6:1 or greater, or about 7:1 or greater, or about 8:1 or greater, or about 9:1 or greater, or about 10:1 or greater. In alternative embodiments, less than a stoichiometric amount of the polyhydroxylated compound can be used. As discussed above, it is believed that by adjusting the amount and identity of polyhydroxylated compound, the dissolution rate of the anhydrous borate particulates can be better controlled. Given the benefit of the present disclosure, one having ordinary skill in the art will be able to choose a cleanup fluid having a particular polyhydroxylated compound present in an amount suitable to achieve a desired dissolution rate.

In general, an amount of the polyhydroxylated compound in the cleanup fluid can range between about 1% and about 99% by weight of the cleanup fluid. In some embodiments, an amount of the polyhydroxylated compound can range between about 5% and about 75% by weight of the cleanup fluid. In other embodiments, an amount of the polyhydroxylated compound can range between about 10% and about 50% by weight of the cleanup fluid.

In alternative embodiments, other compounds can be used in place of a polyhydroxylated compound to affect dissolution of anhydrous borate materials. Illustrative compounds that can be used as a replacement for a polyhydroxylated compound in the present cleanup fluids can include, for example, carboxylic acids, amines, catechols, monohydroxy compounds containing other functional groups that confer water solubility, and the like. In some embodiments, these functional groups can be present in a chelating agent. In some embodiments, a chelating agent such as, for example, ethylenediaminetetraacetic acid (EDTA) can be used in place of a polyhydroxylated compound in the present cleanup fluids. Other suitable chelating agents can be envisioned by one having ordinary skill in the art.

While in the subterranean formation, the anhydrous borate particulates can perform a variety of functions before the cleanup fluid is subsequently introduced. In some embodiments, the present methods can further comprise diverting a fluid in the subterranean formation using the anhydrous borate particulates prior to introducing the cleanup fluid. In some embodiments, the present methods can further comprise preventing loss of a fluid in the subterranean formation using the anhydrous borate particulates prior to introducing the cleanup fluid. In some embodiments, the present methods can further comprise temporarily plugging a wellbore penetrating the subterranean formation using the anhydrous borate particulates prior to introducing the cleanup fluid. In still other embodiments, the anhydrous borate particulates can be introduced into the subterranean formation during a fracturing operation or a gravel packing operation. Specifically, in some embodiments, the anhydrous borate particulates can be introduced into the subterranean formation in a gravel packing fluid.

Providing effective fluid loss control during subterranean treatment operations can be highly desirable. As used herein, the term "fluid loss" refers to the undesirable migration or loss of fluids (e.g., the fluid portion of a drilling mud, a cement slurry, or a treatment fluid) into a subterranean formation and/or a proppant pack. In fracturing operations, for example, fluid loss into the formation can result in a reduced fluid efficiency, such that the fracturing fluid cannot propagate the fracture as desired. Anhydrous borate materials can provide fluid loss control by blocking pore throats and spaces that otherwise would allow a treatment fluid to leak out of a desired zone and into an undesired zone.

Diverting agents can operate similarly to fluid loss control agents, although there are some notable differences. Diverting agents can seal off a portion of the subterranean formation. By way of example, to divert a treatment fluid from a highly permeable portion of the subterranean formation to less permeable portions, a volume of treatment fluid can be pumped into the formation followed by a treatment fluid containing a diverting agent (e.g., anhydrous borate materials), thereby sealing off the portion of the subterranean formation where the first treatment fluid penetrated. After the diverting agent has been placed, a treatment fluid can be diverted to a new subterranean zone.

Plugging agents operate similarly to diverting agents. Whereas diverting agents are used to seal off a portion of the subterranean formation, plugging agents are used to seal off a well bore, thereby providing zonal isolation. Generally, larger quantities of anhydrous borate materials are used for plugging applications than for diverting applications, since a portion of the well bore needs to be filled in the former, whereas, only pore throats or rock faces need to be blocked in the latter.

It is to be further recognized that treatment fluids containing anhydrous borate materials can further comprise any number of additional materials that are used in subterranean treatment operations. In some embodiments, treatment fluids containing anhydrous borate materials can optionally further comprise, for example, acids, bases, buffers, scale inhibitors, corrosion inhibitors, crosslinking agents, polymers, clay stabilizers, biocides, chelating agents, proppants, gravel, fibrous materials, foaming agents, gases, emulsifying agents, surfactants, salts, breakers, solvents, oxidizing agents, reducing agents, and the like. In some embodiments, the cleanup fluids described herein can optionally contain one or more of these additional materials, if desired.

In alternative embodiments of the present disclosure, the polyhydroxylated compound and the anhydrous borate materials can be present together in a single treatment fluid. Under most conditions, anhydrous borate materials do not react rapidly enough with polyhydroxylated compounds to affect solubility in an aqueous fluid during downhole transit times. Accordingly, in such embodiments, the anhydrous borate materials can be pumped downhole as a slurry of particulates, where the anhydrous borate materials can become deposited in the subterranean formation and block or divert fluid flow, for example. Thereafter, the polyhydroxylated compound also present in the treatment fluid can promote the solubilization of the anhydrous borate materials. It is to be noted that the foregoing embodiment can be particularly advantageous for conducting subterranean treatment operations, since it can permit shorter periods of production downtime to be realized. Specifically, such embodiments can eliminate the time needed to introduce a separate cleanup fluid to the subterranean formation and remove the anhydrous borate materials. That is, by combining the anhydrous borate materials and the polyhydroxylated compound in a single treatment fluid, the treatment fluid can be made to be self-cleaning.

In some embodiments, methods described herein can comprise providing a treatment fluid comprising a polyhydroxylated compound and a plurality of particulates that comprise an anhydrous borate compound, introducing the treatment fluid into a subterranean formation, and allowing sufficient time to pass for the anhydrous borate compound and the polyhydroxylated compound to interact with one another such that the anhydrous borate compound becomes soluble in an aqueous fluid. Given the benefit of the present disclosure and knowing the conditions present within a subterranean formation, one having ordinary skill in the art will be able to determine a suitable time for imparting solubility to the anhydrous borate compound. In some embodiments, the carrier fluid of the treatment fluid can comprise an aqueous fluid, such that the anhydrous borate compound can become soluble in the treatment fluid. In other embodiments, the anhydrous borate compound can become soluble in an aqueous formation fluid or another treatment fluid comprising an aqueous carrier fluid.

In some embodiments, methods utilizing a treatment fluid that comprises both an anhydrous borate compound and a polyhydroxylated compound can further comprise allowing the particulates comprising an anhydrous borate material to take part in a treatment operation (i.e., perform a function) in the subterranean formation, after introducing the treatment fluid into the subterranean formation but before the anhydrous borate compound becomes soluble in the treatment fluid or another aqueous fluid. In some embodiments, the function being performed by the anhydrous borate compound can include, for example, diverting a fluid in the subterranean formation, preventing loss of a fluid in the subterranean formation, temporarily plugging a wellbore penetrating the subterranean formation, and any combination thereof.

To facilitate a better understanding of the present invention, the following examples of preferred embodiments are given. In no way should the following examples be read to limit, or to define, the scope of the invention.

EXAMPLES

Example 1

Influence of Sorbitol, Xylitol and Mannitol on the Dissolution of Anhydrous Sodium Tetraborate at Room Temperature In a control test, 1 gram of anhydrous sodium tetraborate was placed in a jar with 50 mL of tap water. The sodium tetraborate took several days to completely dissolve at room temperature.

The influence of polyhydroxylated compounds on the dissolution rate was performed as follows. 1 gram of anhydrous sodium tetraborate was placed in a jar with 50 mL of tap water. To the mixture was added approximately 5 molar equivalents of sorbitol, xylitol or mannitol, and the mixture was allowed to stand at room temperature. The dissolution of the sodium tetraborate was then observed as a function of time. Experimental results are summarized in Table 1.

TABLE 1

| Polyhydroxylated Compound | Amount Added | Time at Room Temperature | Percent Dissolution |
| --- | --- | --- | --- |
| none (control) | — | >48 hrs. | 100% |
| xylitol | 3.4 g | 30 min. | 95% |
| xylitol | 3.4 g | 45 min. | 97% |
| xylitol | 3.4 g | 60 min. | 100% |
| sorbitol | 4.0 g | 30 min. | 80% |
| sorbitol | 4.0 g | 45 min. | 95% |
| sorbitol | 4.0 g | 60 min. | 98% |
| sorbitol | 4.0 g | 75 min. | 100% |
| mannitol | 4.0 g | 55 min. | 100% |

As shown in Table 1, there was some differentiation in sodium tetraborate dissolution rates in the presence of various sugar alcohols. Mannitol and sorbitol are both 6-carbon sugar alcohols that differ in configuration at only one stereogenic center, yet mannitol took 20 minutes less than did sorbitol to affect complete dissolution. Xylitol, a 5-carbon sugar alcohol, took even less time to affect complete dissolution of the sodium tetraborate. The faster dissolution rate in the presence of xylitol is somewhat surprising, since this sugar alcohol has one less hydroxyl group than do sorbitol and mannitol.

Example 2

Influence of Various Compounds on the Dissolution of Anhydrous Sodium Tetraborate at 180° F.

Testing was conducted similarly to that described in Example 1, except 100 mL of tap water was used, and dissolution was conducted at 180° F. instead of room temperature. In addition, other solubilizing compounds were also tested. Experimental results are summarized in Table 2.

TABLE 2

| Solubilizing Compound | Amount Added | Time Until 100% Dissolution |
| --- | --- | --- |
| none (control) | — | >48 hrs. |
| xylitol | 3.03 g | 1 hrs. |
| sorbitol | 3.62 g | 2.25 hrs. |
| mannitol | 3.60 g | 2.5 hrs. |
| propylene glycol | 1.5 g | 4.5 hrs. |
| diethylene glycol | 2.1 g | 5.2 hrs. |
| $K_2$EDTA | 8.04 g | 1 hrs. |

As shown in Example 2, sugar alcohols again produced a faster dissolution rate, with xylitol again providing the fastest dissolution. It is to be noted that even though neither propylene glycol nor diethylene glycol contain a vicinal diol, these polyhydroxylated compounds were still effective to promote dissolution of the sodium tetraborate, albeit at a slower rate than the sugar alcohols. Dipotassium ethylenediaminetetraacetic acid also increased the dissolution rate of sodium tetraborate, even though it lacks hydroxylated functionalities.

Therefore, the present invention is well adapted to attain the ends and advantages mentioned as well as those that are inherent therein. The particular embodiments disclosed above are illustrative only, as the present invention may be modified and practiced in different but equivalent manners apparent to one having ordinary skill in the art and the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a cleanup fluid comprising a polyhydroxylated compound;
   introducing the cleanup fluid into a subterranean formation having a plurality of anhydrous borate particulates therein, the cleanup fluid being introduced to the subterranean formation subsequent to the anhydrous borate particulates; and
   interacting the polyhydroxylated compound with the anhydrous borate particulates such that the anhydrous borate particulates become soluble in an aqueous fluid more rapidly than at their native dissolution rate.

2. The method of claim 1, wherein the anhydrous borate particulates comprise an anhydrous borate compound selected from the group consisting of anhydrous sodium tetraborate, anhydrous boric acid, and any combination thereof.

3. The method of claim 1, wherein the polyhydroxylated compound comprises at least a vicinal diol.

4. The method of claim 1, wherein the polyhydroxylated compound comprises a sugar, a sugar alcohol, or any combination thereof.

5. The method of claim 1, wherein the polyhydroxylated compound comprises a compound selected from the group consisting of mannitol, sorbitol, xylitol, glycerol, erythritol, threitol, arabitol, ribitol, dulcitol, iditiol, isomalt, maltitol, lactitol, polyglycitol, polyvinylalcohol, ethylene glycol, diethylene glycol, triethylene glycol, tetraethylene glycol, propylene glycol, tartaric acid, ascorbic acid, erythorbic acid, any combination thereof, and any derivative thereof.

6. The method of claim 1, wherein the polyhydroxylated compound is present in at least a stoichiometric amount relative to the anhydrous borate particulates.

7. The method of claim 1, wherein the anhydrous borate particulates and the polyhydroxylated compound react to form a soluble boronate ester.

8. A method comprising:
   introducing a plurality of anhydrous borate particulates into a subterranean formation;
   introducing a cleanup fluid comprising a polyhydroxylated compound into the subterranean formation, the cleanup fluid being introduced to the subterranean formation subsequent to the anhydrous borate particulates; and
   solubilizing the anhydrous borate particulates in an aqueous fluid more rapidly than at their native dissolution rate.

9. The method of claim 8, further comprising:
   diverting a fluid in the subterranean formation using the anhydrous borate particulates before introducing the cleanup fluid.

10. The method of claim 8, further comprising:
    preventing loss of a fluid in the subterranean formation using the anhydrous borate particulates before introducing the cleanup fluid.

11. The method of claim 8, further comprising:
    temporarily plugging a wellbore penetrating the subterranean formation using the anhydrous borate particulates before introducing the cleanup fluid.

12. The method of claim 8, wherein the anhydrous borate particulates are introduced into the subterranean formation in a gravel packing fluid.

13. The method of claim 8, wherein the anhydrous borate particulates comprise an anhydrous borate compound selected from the group consisting of anhydrous sodium tetraborate, anhydrous boric acid, and any combination thereof.

14. The method of claim 8, wherein the polyhydroxylated compound comprises at least a vicinal diol.

15. The method of claim 8, wherein the polyhydroxylated compound comprises a sugar, a sugar alcohol, or any combination thereof.

16. The method of claim 8, wherein the polyhydroxylated compound comprises a compound selected from the group consisting of mannitol, sorbitol, xylitol, glycerol, erythritol, threitol, arabitol, ribitol, dulcitol, iditiol, isomalt, maltitol, lactitol, polyglycitol, polyvinylalcohol, ethylene glycol, diethylene glycol, triethylene glycol, tetraethylene glycol, propylene glycol, tartaric acid, ascorbic acid, erythorbic acid, any combination thereof, and any derivative thereof.

17. The method of claim 8, wherein the polyhydroxylated compound is present in at least a stoichiometric amount relative to the anhydrous borate particulates.

18. The method of claim 8, wherein the anhydrous borate particulates and the polyhydroxylated compound react to form a soluble boronate ester.

* * * * *